April 13, 1954     D. B. DOUBLEDAY     2,675,129
CONTINUOUS FILTER

Filed May 23, 1951     2 Sheets-Sheet 1

INVENTOR
DONALD B. DOUBLEDAY
BY
ATTORNEY

April 13, 1954 D. B. DOUBLEDAY 2,675,129
CONTINUOUS FILTER
Filed May 23, 1951 2 Sheets-Sheet 2
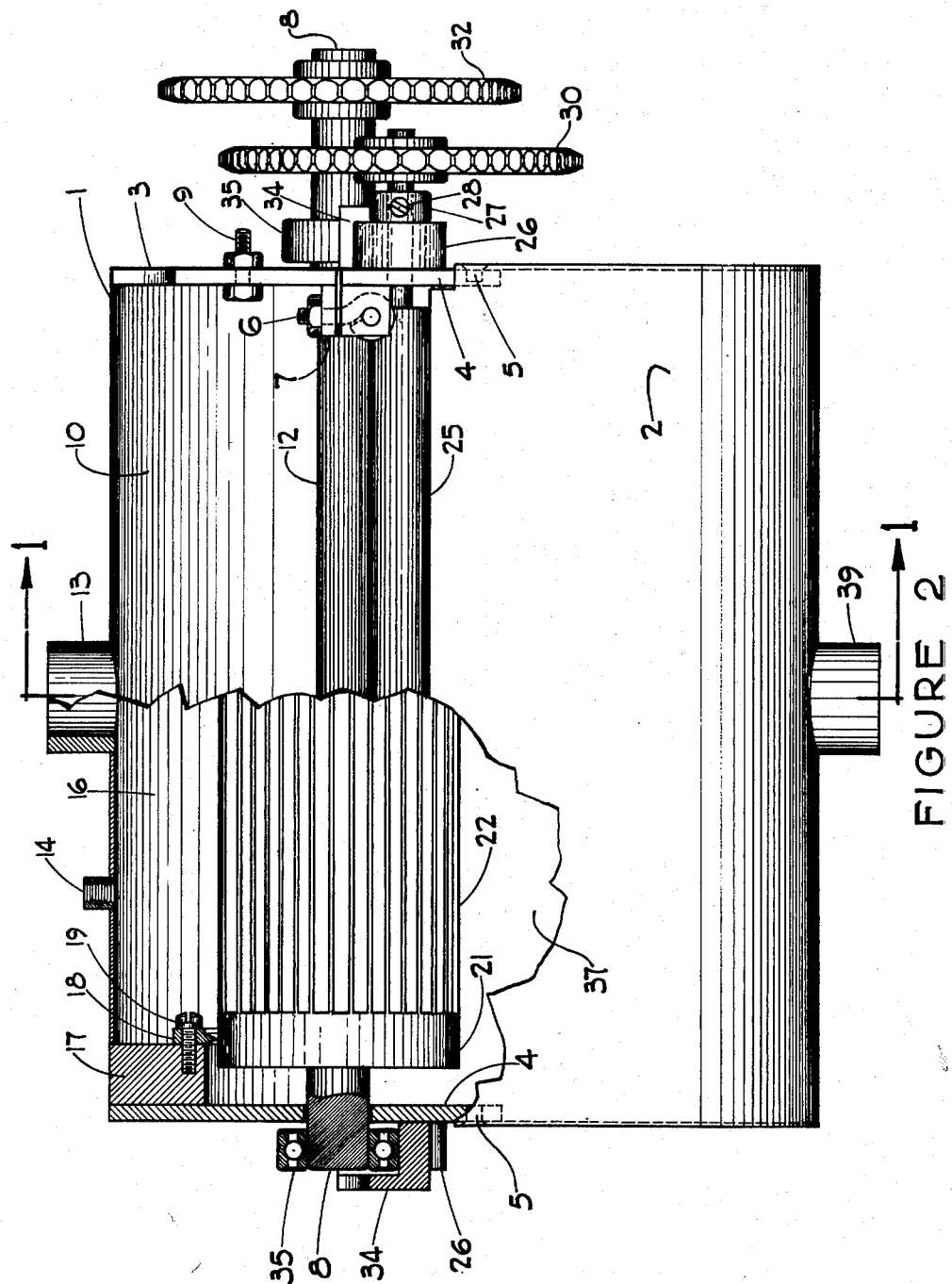
INVENTOR
DONALD B. DOUBLEDAY
BY
his
ATTORNEY Patented Apr. 13, 1954

2,675,129

UNITED STATES PATENT OFFICE 2,675,129

CONTINUOUS FILTER

Donald B. Doubleday, Joliet, Ill., assignor to The Sherwin-Williams Company, Cleveland, Ohio, a corporation of Ohio Application May 23, 1951, Serial No. 227,859

5 Claims. (Cl. 210—197)

1

This invention relates to an improved filter useful in the manufacture of paints, enamels, varnishes, lacquers and the like.

More particularly, this invention relates to a continuous filter of the drum type wherein filter media in sheet or strip form is continuously fed over a supporting drum to provide a substantially constant flow rate through the filter despite the tendency of the filter media to become choked with impedimenta deposited therein from the material undergoing filtration. Additionally, the filter is adapted to receive filter media of various porosities whereby it is possible to remove varnish gels, undispersed pigment agglomerates, etc., above a certain particles size from coating compositions. As removal of particles over certain sizes is important to the grading of quality products in the decorative and protective coatings field, the need for a device adapted to produce filtered products containing particles below a pre-determined size at a constant flow rate has long been felt.

Presently, the industry had adapted high speed centrifuges to the problem above mentioned, but the objection is that when the density of the particle approaches the density of the fluid in which the particle is suspended, the described means fails to perform satisfactorily. Additionally, periodic clean-up of the equipment requires a plurality of centrifuges, or loss-time from production, objectionable during peak demand periods.

Use of continuously renewable filter media in strip or sheet form has previously been suggested in the art, but contamination of the product due to leakage, and the inability of the prior art devices to be adapted to forces above atmospheric, or above gravity, have prevented widespread adaptation of such devices to the filtration of protective coatings.

It is the general object of this invention to provide an apparatus for the filtering of fluid coatings adapted to receive and dismiss filter media in continuous strip form, and to provide a substantially constant filter rate through the filter.

It is a specific object to provide a filter having a continuously renewable filter media, which can be operated under pressures above atmospheric and yet not allow contamination of the filtrate with leakage from above the filter zone.

It is another specific object to provide a constant flow filter, operating under a controlled pressure head, so as to control accurately the character of the material passing through the filter media. This and other objects and advantages will become apparent in view of the detailed description of my improved continuous paint filter which follows:

Referring generally to the drawings:

Figure 2 is a side view of the filter unit showing the side of egress of the spent filter media with a portion of the exterior shell casing broken away to illustrate elements interiorly thereof.

Figure 1:
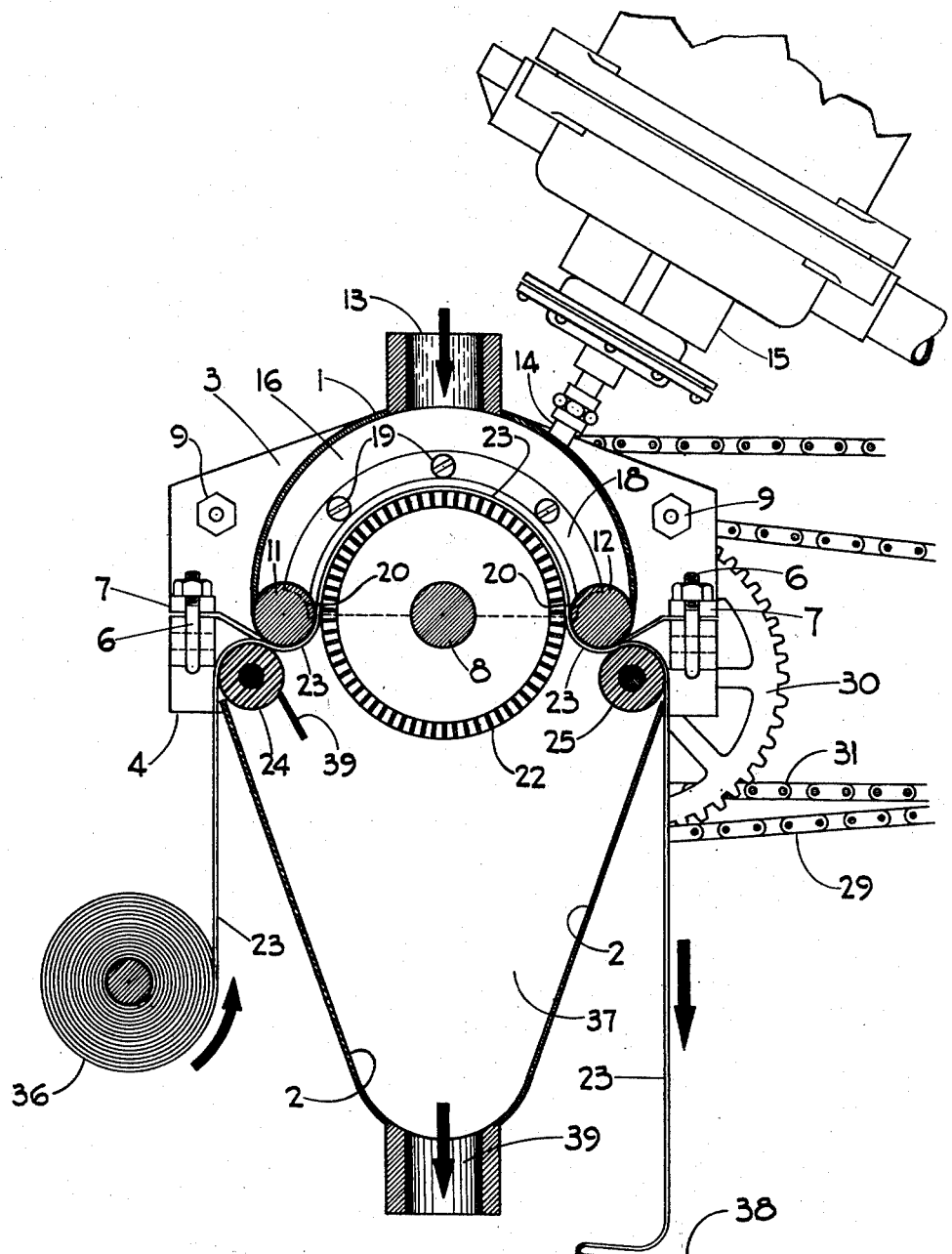
Figure 1 is a cross-sectional view of the assembled filter unit taken through the line 1—1 of Figure 2 showing the filter media positioned within the device.

Referring in detail to the drawings, the exterior shell casing is composed generally of several main construction elements. A top shell casing 1 is welded to top end plates 3 and a bottom shell casing 2 is removably attached to bottom end plates 4 by screws 5. Top and bottom plates 3 and 4 are held together through toggle bolts 6 attached to lower plates 4 and toggle bolt receiving U's 7 attached to upper plates 3. Upper plates 3 and lower supporting plates 4 join principally along a horizontal center-line through shaft 8. Mounting bolts 9 provide suspension means for the assembled filter unit at the point of use.

Top shell casing 1 comprises an arcuate sheet metal shell member 10 welded at its opposite ends to upper plates 3. Two horizontally disposed steel rods 11 and 12 are welded to and define the lower extremes of the top shell 1 and assist in providing guide and sealing means for the ingress and egress of filter media 23 through the filter zone. Orifice 13 provides entry means for materials to be filtered and nipple 14 provides attachment means for pressure responsive switch 15. Both latter elements provide entry into upper filter zone 16. Filler blocks 17 interiorly of top shell casing 1 provide support for compression ring segments 18 attached to blocks 17 by cap screws 19. Ends of the arcuate compression ring segments are embedded in slots 20 in rods 11 and 12 extending below the points of tangency of rods 11 and 12 with filter drum 22. While machined within relatively close tolerances, during assembly a sealing mastic is used to insure pressure-tight engagement between the slots 20 and the ends of the compression ring segments 18. The cross-sectional view of the compression ring 18 as shown in Figure 2 indicates the rounded edge of the compression ring 18 as it bears upon the filter media when adjacent the smooth portion 21 of the filter drum 22. Upon feeding filter media 23 over the filter drum, the smooth fit of the described compression rings 18 over area 21 is important to the trouble-free nature of operation of the filter unit, and bears directly upon the quality and rate of output of filtered product.

The bottom plates 4 provide hanger means for rubber covered inlet filter media feed roller 24 and rubber covered outlet filter media roller 25. The oppositely disposed ends of the central shafts of feed rollers 24 and 25 are couched in bronze-bushed common bearings 26 welded to lower plates 4. Horizontal motion of roller shafts 24 and 25 is prevented by means of collars 27 exteriorly of the bearings 26 and keyed to the central shaft of rollers 24 and 25 by set-screws 28.

Rotation of the filter media outlet feed roller 25 is provided through chain 29 and sprocket gear 30 operated from an exterior power source. Roller 24 is a rotatable roller or idler, serving to compress the filter media 23 along a tangential line of near contact of roller 24 and rod 11 and thus to seal the upper chamber 16 from the lower chamber 37. Movement of roller 24 is effected when the filter element 23 is advanced by the driven roller 25. Rotation of filter drum 22 in the same direction is provided by chain 31 and sprocket gear 32 also operated from an exterior motive force. The relative linear or peripheral speed of roller 25 is about 5 degrees of arc faster than the peripheral speed of filter drum 22. This slight speed differential prevents wrinkling of the filter media 23 and complications within the filter zone 16. Timed rotation of filter drum 22 and roller 25 advances the filter media from supply roller 36 through the filter. Bearing saddles 34 welded to the lower plate 4 support roller bearings 35 in which shaft 8 and filter drum 22 are rotatably supported. During filtration, rotation of sprocket gears 30 and 32 advance filter media 23 from supply roller 36 over rubber covered roller 24, into compression between roller 24 and rod 11 and, in turn, into compression between filter drum 22 and rod 11. The tolerance between filter drum 22 and rod 11 is such as to form a fluid-tight seal, when in conjunction with filter media 23, at a point of tangency which is very slightly above the center of rod 11. In other words, the horizontal center line of rod 11 is slightly above the horizontal center-line of drum 22 when top shell casing 3 is positioned over bottom shell casing 2. Upon tightening the toggle bolts 6, the filter media 23 is compressed along the tangential line of near contact of rod 11 and drum 22 assisting to effect a seal between the upper chamber 16 and lower chamber 37. The filter media 23 passes over the filter drum 22 and between the compression ring segments 18 disposed at opposite ends of filter drum 22 and the filter drum. At the exit side, filter media 23 is again compressed at a point of tangency of drum 22 and rod 12, slightly above the centerline of rod 12, and is pulled outwardly by and over roller 25 again in compression between roller 25 and rod 12. Effective sealing between fluid entry zone 16 and filtrate exit zone 37 makes possible super-atmospheric filter pressures without leakage of unfiltered material into filtrate zone 37 to cause contamination of the filtrate. In its preferred form, the invention includes pressure-responsive switch 15, although the filter may alternatively be manually operated. In the preferred form of the invention, when the pressure within the top shell section or zone 16 reaches a pre-determined maximum (10–12#/sq. in. has been found useful with certain classes of goods) the switch 15 closes a circuit starting an electrical motor (not shown) which moves chain 29, sprocket-gear 30 and roller 25 clockwise causing advancement of filter media 23 over drum 22. As clean filter media is interposed between zone 16 and zone 37, the pressure in zone 16 falls off. Switch 15 responding to the change in pressure, opens the circuit to the driving means arresting driven means 29, 30 and 25.

New filter media allows re-establishment of the desired filter rate, a decrease in pressure across the filter media, response to the change in switch 15, and activation of arrest of rotational movement in the filter media advancing elements of the filter unit. Spent filter media 38 is collected in a suitable container or allowed to accumulate in sufficient quantity to be otherwise disposed of. Important to clean operation is the doctor-blade 39 in contact with roller 24, interiorly of zone 37, which serves to remove the excess of accumulated filtered material from the roller 24 and to prevent carry-over of material exteriorly of the bottom shell casing 2.

While automatic advancement of filter media 23, as described, is preferred, it is apparent that manual advancement means may also be employed in maintaining control of filtration rate at a relatively constant level. Filtered material is collected in the bottom shell casing 2, and can be removed therefrom through exit channel 39 for further processing or use. To avoid the complexities of construction providing adjustment for possible wear, filter media of increased thickness can be used, if necessary, to provide effective sealing between elements rotating in respect to one another.

Experience in trials thus far conducted indicates that paints, varnishes and enamels may be up-graded in quality, and material which was formerly subject to rejection because of seeding, agglomerates, pigment-breaking, etc., can now be recovered, or up-graded, at a rapid rate with little additional manufacturing cost. While other filter media may be used successfully, roll felts have been found desirable for my purposes.

It is apparent that many modifications of the filter unit hereinabove described may be made, but what I claim is:

1. Apparatus for filtration comprising a container having inlet and outlet means for the passage of fluids therethrough, oppositely disposed horizontal slits in the sides of said container providing space accommodation for continuous strip filter media to traverse the course of fluids passed through said container, a liquid permeable drum for support and advancement of strip filter media rotatably housed and axially suspended interiorly of said container defining an upper receiving chamber and a lower discharge chamber, rotary driven means adjacent to and coordinated with said drum for advancement of strip filter media through said upper chamber and oppositely disposed arcuate ring segments adapted to provide compression means between said upper chamber and said drum upon the perimeter of the operable filter media to seal said upper chamber from said lower chamber about said perimeter area to prevent leakage and contamination of filtered material by unfiltered material.

2. Apparatus for filtration comprising a container having upper inlet and lower outlet means for the passage of fluids therethrough, oppositely disposed horizontal slits in the sides of said container providing space accommodation for continuous strip filter media to traverse the course of fluids passed through said container, a liquid permeable drum for support and advancement of strip filter media rotatably housed and axially suspended interiorly of said container defining an upper receiving chamber and a lower discharge chamber, rotary driven means adjacent to and coordinated with said drum for advancement of strip filter media through said upper chamber, and arcuate compression ring segment elements disposed at opposite ends of the filter drum, concentric therewith, operable between said upper chamber and said drum upon the outside edges of strip filter media to seal said upper chamber from said lower chamber about said perimeter to prevent leakage and contamination of filtered material in the lower chamber by unfiltered material from the upper chamber.

3. Apparatus for continuous filtration at a constant rate comprising a container having upper inlet and lower outlet means for the passage of fluids therethrough, oppositely disposed horizontal slits in the sides of said container providing space accommodation for continuous strip filter media to traverse the course of fluids passed through said container, a liquid permeable drum for support and advancement of strip filter media rotatably housed and axially suspended interiorly of said container defining an upper receiving chamber and a lower discharge chamber, rotary driven means adjacent to and coordinated with said drum for advancement of strip filter media through said upper chamber activated by a pressure responsive switch in conjunction with said upper chamber, and arcuate compression ring segment elements disposed at opposite ends of the filter drum, concentric therewith, and horizontal rods oppositely disposed said ring segments and rods operable between said upper chamber and said drum upon the perimeter of the effective filter media area to prevent leakage and contamination of filtered material in the lower chamber by unfiltered material from the upper chamber.

4. Apparatus for filtration comprising a container having upper inlet and lower outlet means for the passage of fluids therethrough, oppositely disposed horizontal rods defining the lower extremities of an upper chamber and immediately below said rods oppositely disposed horizontal rollers defining the upper extremities of a lower chamber in said container, said rods and rollers providing space accommodation therebetween for entry and exit of continuous strip filter media to traverse the course of fluids passed downwardly through said container, a liquid permeable drum for support and advancement of strip filter media, said drum rotatably housed and axially suspended interiorly of said container defining an upper receiving chamber operable at pressures above atmospheric and a lower discharge chamber inoperative at pressures other than atmospheric, means for advancement of strip filter media through said upper chamber, and arcuate compression ring segment elements disposed at opposite ends of the filter drum, concentric therewith, said rods and ring segments operable between said upper chamber and said drum upon the perimeter of the effective filter media area to prevent leakage and contamination of filtered material in the lower chamber by unfiltered material from the upper chamber.

5. Apparatus for continuous filtration at a constant rate comprising a container having upper inlet and lower outlet means for the passage of filterable fluids therethrough, oppositely disposed horizontal rods defining the lower extremities of an upper chamber and immediately below said rods, oppositely disposed horizontal rollers defining the upper extremities of a lower chamber in said container, said rods and rollers providing means for entry and exit of continuous strip filter media compressively therebetween, said filter media traversing the course of fluids passed downwardly through said container, a liquid permeable drum for support and advancement of strip filter media, said drum rotatably housed and axially suspended interiorly of said container further defining an upper receiving chamber operable at pressures above atmospheric when in conjunction with filter media, a pressure responsive switch in conjunction with said upper chamber to activate means for advancement of strip filter media through said upper chamber, and arcuate compression ring segment elements disposed at opposite ends of the filter drum, concentric therewith, the ends of said segments adapted to be received in slots in said rods, said rods and ring segments in rigid attachment to said upper chamber and a lower chamber and said compression ring segments and said horizontal rods operable between said upper chamber and the filter drum, about the perimeter of the effective filter media area, to prevent leakage of unfiltered material through the described perimeter area to contaminate filtered material in said lower chamber.

References Cited in the file of this patent

UNITED STATES PATENTS

| Number | Name | Date |
| --- | --- | --- |
| 794,631 | Milne | July 11, 1905 |
| 2,330,542 | Barnebl et al. | Sept. 28, 1943 |

FOREIGN PATENTS

| Number | Country | Date |
| --- | --- | --- |
| 22,852 | Great Britain | of 1902 |